(12) United States Patent
Yamamoto

(10) Patent No.: US 6,347,529 B1
(45) Date of Patent: Feb. 19, 2002

(54) AUGER TYPE ICE MAKING MACHINE

(75) Inventor: Jiro Yamamoto, Yokkaichi (JP)

(73) Assignee: Hoshizaki Denki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/559,592

(22) Filed: Apr. 28, 2000

(30) Foreign Application Priority Data

Apr. 28, 1999 (JP) .......................................... 11-122587

(51) Int. Cl.[7] ................................................ F25C 1/14
(52) U.S. Cl. ...................................... 62/354; 403/359.1
(58) Field of Search .......................... 62/354; 403/361, 403/359.1, 359.6

(56) References Cited

U.S. PATENT DOCUMENTS

| | | | |
|---|---|---|---|
| 4,115,022 A | * | 9/1978 | Orain .......................... 403/359 |
| 4,250,718 A | * | 2/1981 | Brantly ........................ 62/354 |
| 4,467,622 A | * | 8/1984 | Takahashi et al. ............. 62/384 |
| 5,644,927 A | * | 7/1997 | Tatematsu et al. ............. 62/354 |
| 5,974,823 A | * | 11/1999 | Banno et al. ................. 403/361 |

* cited by examiner

Primary Examiner—William E. Tapolcai
Assistant Examiner—Mohammad M. Ali
(74) Attorney, Agent, or Firm—Arent Fox Kintner Plotkin & Kahn, PLLC

(57) ABSTRACT

An auger type ice making machine including an upright cylindrical evaporator housing, an auger mounted for rotary movement within the evaporator housing to scrape off ice crystals formed on an internal freezing surface of the evaporator housing and having a lower end portion drivingly connected to an upper end portion of an output shaft of a drive mechanism, wherein the lower end portion of the auger is in the form of either a columnar portion or a cylindrical portion, while the upper portion of the output shaft is in the form of either a cylindrical portion or a columnar portion, and wherein the columnar portion of the auger or output shaft is coupled within the cylindrical portion of the output shaft or auger for drive connection between the output shaft and the auger.

2 Claims, 2 Drawing Sheets

AUGER TYPE ICE MAKING MACHINE

BACKGROUND OF THE INVENTION

1. Field of the Invention

The present invention relates to an auger type ice making machine, and more particularly to an improvement of a connecting mechanism of an auger with an output shaft of a drive mechanism in the ice making machine.

2. Description of the Prior Art

Disclosed in Japanese Utility Model Laid-open Publication No. 56-163270 is an auger type ice making machine which comprises an upright cylindrical evaporator housing supplied with fresh water for ice making and cooled from its outer periphery, an auger mounted for rotary movement within the evaporator housing and a drive mechanism for effecting rotary movement of the auger, wherein the auger is connected at its lower end to an upper end of an output shaft of the drive mechanism and is driven by the power applied from the drive mechanism to scrape ice crystals off an internal freezing surface of the evaporator housing and to advance the scraped ice crystals upward.

As shown in FIG. 3 (b), the upper end portion 1 of the output shaft of the drive mechanism is formed with external spline, while the lower end portion 2 of the auger is also formed with external spline. Thus, the upper end portion 1 of the output shaft and the lower end portion 2 of the auger are splined with internal spline of a joint sleeve 3 and confronted to one another at their distal ends to effect torque transmission through the joint sleeve 3.

As in the auger type ice making machine, the upper end portion 1 of the output shaft and the lower end portion 2 of the auger are confronted to one another at their distal ends, the height of the ice making mechanism is inevitably increased, and the size of the ice making machine is enlarged. In the case that such a joint sleeve is used for connection of the auger to the output shaft of the drive mechanism the number of component parts is increased.

SUMMARY OF THE INVENTION

It is, therefore, a primary object of the present invention to provide an auger type ice making machine wherein the connecting mechanism of the auger with the output shaft of the drive mechanism is improved to reduce the height of the ice making mechanism for providing the ice making machine in a small size and to reduce the number of component parts for decreasing the manufacturing cost.

According to the present invention, the object is accomplished by providing an auger type ice making machine including an upright cylindrical evaporator housing, an auger mounted for rotary movement within the evaporator housing to scrape off ice crystals formed on an internal freezing surface of the evaporator and having a lower end portion drivingly connected to an upper end portion of an output shaft of a drive mechanism, wherein the lower end portion of the auger is in the form of either a columnar portion or a cylindrical portion, while the upper portion of the output shaft is in the form of either a cylindrical portion or a columnar portion, and wherein the columnar portion of the auger or output shaft is coupled within the cylindrical portion of the output shaft or auger for drive connection between the output shaft and the auger.

In an aspect of the present invention, the lower end portion of the auger is in the form of a columnar portion formed thereon with external spline, while the upper end portion of the output shaft is in the form of a cylindrical portion formed therein with internal spline, and wherein the columnar portion of the auger is coupled within the cylindrical portion of the output shaft and engaged at its external spline with the internal spline of the output shaft for drive connection between the output shaft and the auger.

In another aspect of the present invention, the output shaft is formed therein with an axial bore in open communication with a space between the lower end portion of the auger and the upper end portion of the output shaft to discharge the water leakage from a mechanical seal mechanism between the lower part of the evaporator housing and the lower end shaft portion of the auger.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
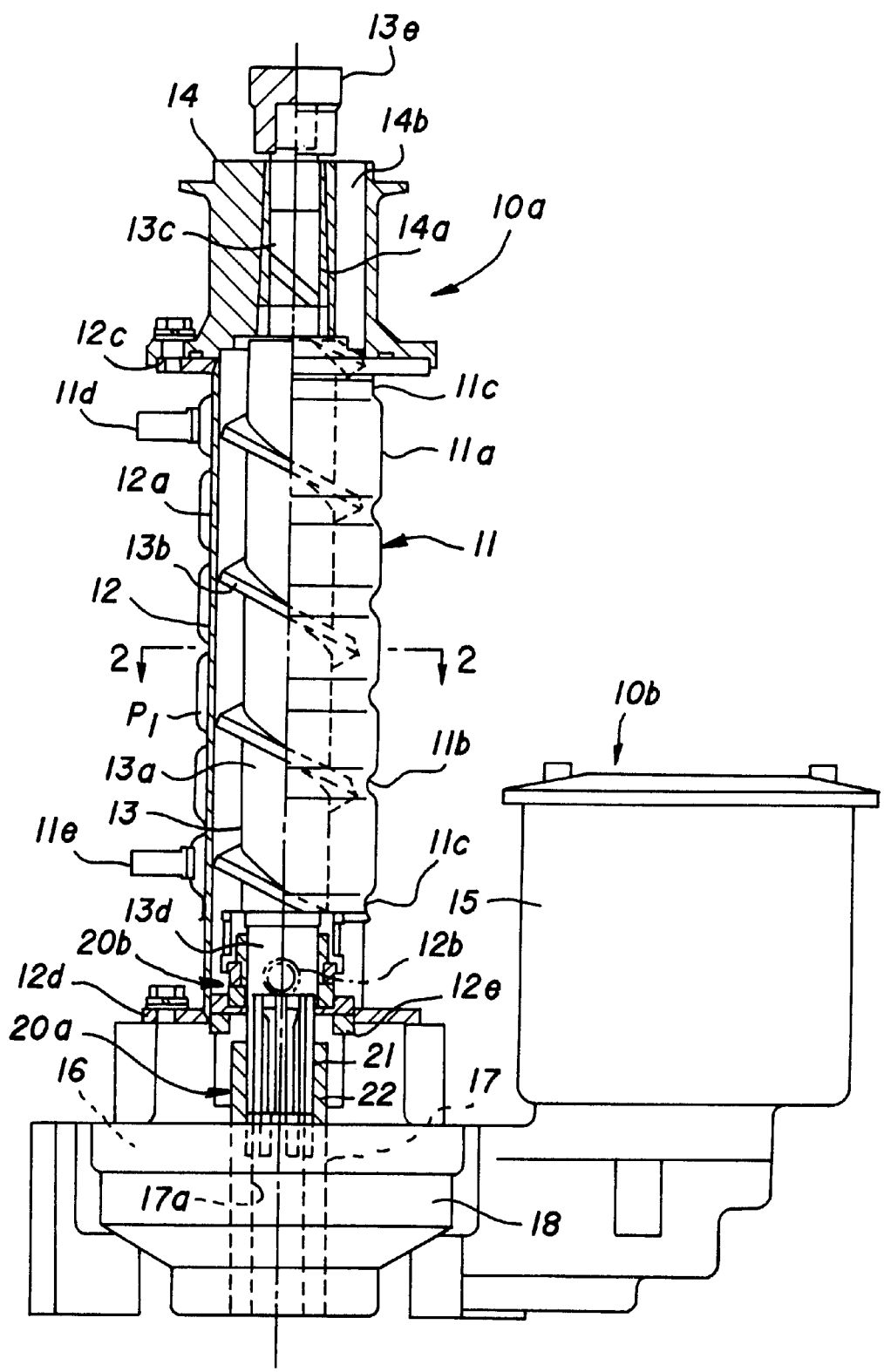
FIG. 1 is a partly broken sectional view of an auger type ice making machine in accordance with the present invention.

Illustrated in FIG. 1 is an embodiment of an auger type ice making machine in accordance with the present invention, which is composed of a freezing mechanism 10a and a drive mechanism 10b. The freezing mechanism 10a includes a cylindrical outer housing shell 11, an upright cylindrical evaporator housing 12, an auger 13 and an extruding head 14. The drive mechanism 10b includes an electric motor 15, a speed-reduction gear train 16, and an output shaft 17 in drive connection to the speed-reduction gear train 16. In the ice making mechanism 10, the auger 13 is drivingly connected to the output shaft 17 of the drive mechanism 10b through a connecting mechanism 20a.

Figure 2:
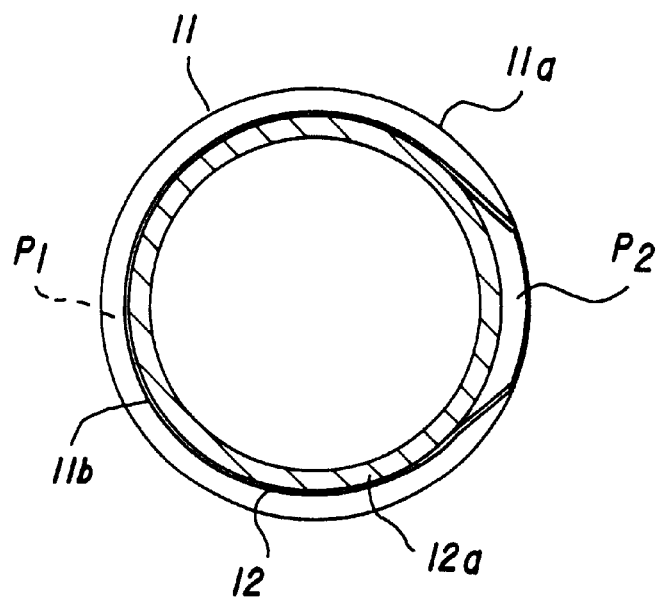
FIG. 2 is a cross-sectional view taken along line 2—2 in FIG. 1.

The cylindrical outer housing shell 11 has a cylindrical body portion 11a reduced in diameter at a predetermined interval to form a number of reduced portions 11b of non-circular in cross-section as shown in FIG. 2 and to form a pair of reduce portions 11c of circular in cross-section located at the upper and lower ends of body portion 11a. The cylindrical body portion 11a of outer housing shell 11 is coupled with the cylindrical evaporator housing 12 and brazed to the outer peripheral surface of evaporator housing 12 at its reduced portions 11b and 11c. The outer housing shell 11 is provided at its upper portion with an inlet pipe 11d of refrigerant and at its lower portion with an outlet pipe 11e of refrigerant.

The cylindrical evaporator housing 12 has a cylindrical body portion 12a provided at its lower part with an inlet pipe 12b of fresh water for ice making and a pair of axially spaced annular flanges 12c and 12d coupled therewith at its upper and lower ends. The evaporator housing 12 is mounted on a casing 18 of the speed-reduction gear train 16 at its lower end flange 12d through a seal-ring 12e and fixed in an upright position.

The auger 13 has a body portion 13a integrally formed thereon with a helical blade 13b and upper and lower end shaft portions 13c and 13d. The lower ends shaft portion 13d of auger 13 is drivingly connected to the output shaft 17 by means of the connecting mechanism 20a in a condition where the auger 13 has been mounted for rotary mechanism within the evaporator housing 12 and where the upper end shaft portion 13c of auger 13 has been rotatively carried by a liner sleeve 14a in the extruding head 14 mounted on the annular flange 12c of evaporator housing 12. In addition, a mechanical seal mechanism 20b is provided between the lower part of evaporating housing 12 and the lower end shaft portion of auger 13 to rotatively support the lower end shaft portion 13d of auger 13 in a liquid-tight manner and to prevent leakage of the fresh water for ice making from an annular space between the evaporator housing 12 and auger 13.

In the auger type ice making machine, a plurality of axially equally spaced annular flow passages P1 of refrigerant are formed between the outer housing shell 11 and evaporator housing 12. The annular flow passages P1 are formed at plural steps in the axial direction of evaporator housing 12 and communicated with each other through each passage P2 shown in FIG. 2.

In operation of the auger type ice making machine, the fresh water for ice making is supplied into the evaporator housing 12 through the inlet pipe 12b and is constantly maintained at the same level in the evaporator housing 12, the refrigerant is supplied into the inlet pipe 11d and circulated through the flow passages P1, P2 and outlet pipe 11e, and the electric motor 15 is activated to drive the auger 13. Thus, the evaporator housing 12 is cooled by the refrigerant to freeze the fresh water at its internal freezing surface, and ice crystals successively formed on the internal freezing surface of evaporator housing 12 are scraped off by the helical blade 13a of auger 13 and introduced into compression passages 14b of extruding head 14. The ice crystals introduced into the extruding head 14 are successively compressed and extruded upwardly as relatively hard bodies of ice. In this instance, the compressed ice bodies are broken by a cutter 13e and discharged by rotation of the auger 13.

Figure 3A:
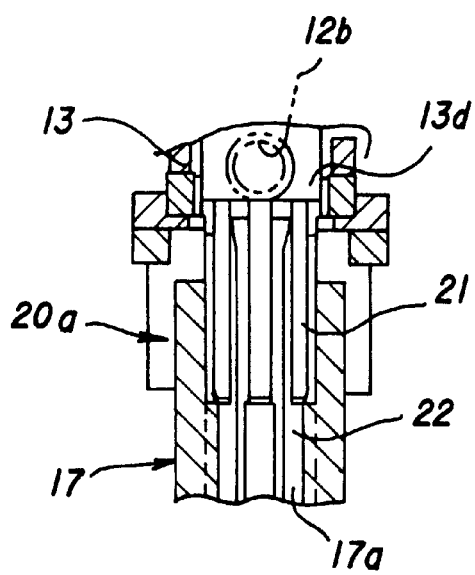
FIG. 3(a) is a vertical sectional view of a connecting mechanism for connection of an auger with an output shaft in the ice making machine shown in FIG. 1.
Figure 3B:
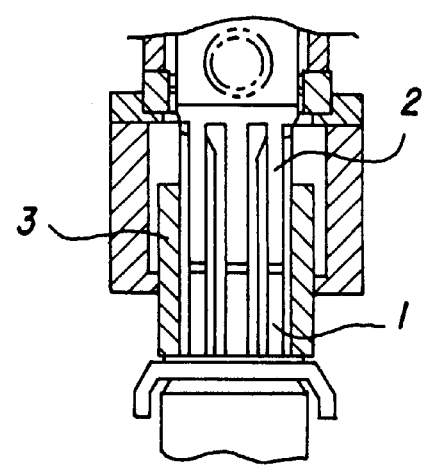
FIG. 3(b) is a vertical sectional view of a connection mechanism for connection of an auger with an output shaft in a conventional ice making machine.

In the ice making machine, the connecting mechanism 20a is adapted to drivingly connect the auger 13 of the ice making mechanism 10a to the output shaft 17 of the drive mechanism 10b. As shown in FIG. 1 and 3, the connecting mechanism 20a includes a first columnar connecting portion 21 extended from the lower end shaft portion 13d of auger 13 and a second cylindrical connecting portion 22 formed on the upper end of output shaft 17. The first columnar connecting portion 21 is formed with external spine, while the second cylindrical connecting portion 22 is formed with internal spline. Thus, the first columnar connecting portion 21 is coupled within and splined to the second cylindrical connecting portion 22 to provide drive connection between the output shaft 17 of drive mechanism 10b and the lower end shaft portion 13d of auger 13.

As in the connecting mechanism 20a, the columnar connecting portion 21 is inserted into and splined to the cylindrical connecting portion 22, the vertical length of the connecting portion of the auger 13 and output shaft 17 is reduced. This useful to lower the height of auger 13 in the ice making mechanism 10a thereby to manufacture the ice making machine in a small size.

In the connecting mechanism 20a, the joint sleeve used in the conventional ice making machine can be removed to reduce the number of component parts of the ice making machine thereby to reduce the manufacturing cost of the machine. In addition, the upper end of output shaft 17 and the lower end of auger 13 are positioned to rotate on a common axis. Thus, the radial load acting on the lower end of auger 13 is sufficiently received by a set of ball bearings for support of the output shaft 17. Accordingly, the conventional bearings for receiving the radial load acting on the lower end of auger 13 can be removed to reduce the number of component parts of the ice making machine.

In the connecting mechanism 20a, an axial bore 17a of output shaft 17 is useful to discharge the water leaking from the mechanical seal mechanism 20b outwardly thereby to decrease chlorine concentration of the water entrapped in the space between the upper end of output shaft 17 and the lower end of auger 13 for preventing corrosion of the component parts of the connecting mechanism 20a.

In actual practice of the connecting mechanism 20a, the first columnar connecting portion extend from the lower end shaft portion 13d of auger 13 may be replaced with a cylindrical portion formed therein with internal spine, whereas the second cylindrical connecting portion 22 formed on the upper end of output shaft 17 may be replaced with a columnar portion formed with external spline for engagement with the internal spline of the cylindrical portion.

What is claimed is:

1. An auger type ice making machine including an upright cylindrical evaporator housing, an auger mounted for rotary movement within the evaporator housing to scrape off ice crystals formed on internal freezing surface of the evaporator housing and having a lower end portion drivingly connected to an upper end portion of an output shaft of a drive mechanism, wherein the lower end portion of said auger is in a form of either a columnar portion or a cylindrical portion, while the upper end portion of said output shaft is in the form of either a cylindrical portion or a columnar portion, and wherein the columnar portion of said auger or output shaft is coupled within the cylindrical portion of said output shaft or auger for drive connection between said output shaft and said auger, wherein said output shaft is formed therein with an axial bore in open communication with a space between the lower end portion of said auger and the upper end portion of said output shaft to discharge water leaking from a mechanical seal mechanism between the lower part of said evaporated housing and the lower end portion of said auger.

2. An auger type ice making machine as recited in claim 1, wherein the lower end portion of said auger is in the form of a columnar portion formed thereon with an external spline, while the upper end portion of said output shaft is in the form of a cylindrical portion formed therein with an internal spline, and wherein the columnar portion of said auger is coupled within the cylindrical portion of said output shaft and engaged at its external spline with the internal spline of the cylindrical portion of said output shaft for drive connection between said output shaft and said auger.

* * * * *